United States Patent
Vande Brake et al.

(10) Patent No.: US 7,175,165 B1
(45) Date of Patent: Feb. 13, 2007

(54) AIR SPRING AND SHOCK ABSORBER ASSEMBLY FOR USE IN SUSPENSION SYSTEMS

(75) Inventors: Kenneth R. Vande Brake, Alton, IA (US); Jeffrey S. Nibbelink, Sioux Center, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 143 days.

(21) Appl. No.: 11/125,776

(22) Filed: May 10, 2005

(51) Int. Cl.
F16F 9/04 (2006.01)
F16F 9/43 (2006.01)

(52) U.S. Cl. .............................. 267/64.24; 267/64.27; 267/64.21

(58) Field of Classification Search ............. 267/64.27, 267/64.21, 64.23, 64.24, 64.19, 64.15
See application file for complete search history.

(56) References Cited

U.S. PATENT DOCUMENTS

| | | | | |
|---|---|---|---|---|
| 4,325,541 A * | 4/1982 | Korosladanyi et al. | ...... | 267/220 |
| 4,445,673 A * | 5/1984 | Clark | ...... | 267/64.24 |
| 4,502,673 A * | 3/1985 | Clark | ...... | 267/64.24 |
| 4,506,751 A * | 3/1985 | Stephens | ...... | 180/89.15 |
| 4,513,845 A * | 4/1985 | Stephens et al. | ...... | 188/299.1 |
| 4,588,171 A * | 5/1986 | Stephens | ...... | 267/64.24 |
| 5,649,692 A * | 7/1997 | Gilsdorf et al. | ...... | 267/64.21 |
| 6,202,972 B1* | 3/2001 | Manavi | ...... | 248/421 |
| 6,247,306 B1* | 6/2001 | Sonnak | ...... | 267/122 |
| 6,332,624 B1* | 12/2001 | Gilsdorf et al. | ...... | 280/124.16 |
| 6,382,602 B1* | 5/2002 | Morrow | ...... | 267/64.23 |
| 6,443,436 B1* | 9/2002 | Schel | ...... | 267/64.21 |
| 6,581,918 B2* | 6/2003 | Voelkel | ...... | 267/64.27 |
| 6,607,186 B2* | 8/2003 | Voelkel | ...... | 267/64.27 |
| 6,685,173 B2 | 2/2004 | Oldenettel et al. | ...... | 267/64.24 |
| 6,715,744 B2* | 4/2004 | Bell | ...... | 267/64.15 |
| 6,722,640 B2 | 4/2004 | Memmel et al. | ...... | 267/64.24 |
| 6,814,346 B2 | 11/2004 | Muller et al. | ...... | 267/64.21 |
| 6,923,433 B2* | 8/2005 | Gross et al. | ...... | 267/64.11 |
| 2002/0163111 A1* | 11/2002 | Voelkel | ...... | 267/64.27 |
| 2002/0171185 A1* | 11/2002 | Morrow | ...... | 267/64.12 |
| 2003/0030195 A1* | 2/2003 | Voelkel | ...... | 267/64.19 |
| 2003/0137086 A1* | 7/2003 | Gross et al. | ...... | 267/64.11 |
| 2004/0026836 A1* | 2/2004 | Brookes | ...... | 267/64.23 |
| 2004/0222576 A1* | 11/2004 | Oldenettel | ...... | 267/64.19 |

* cited by examiner

*Primary Examiner*—Robert A. Siconolfi
(74) *Attorney, Agent, or Firm*—Thomte, Mazour & Niebergall; Dennis L. Thomte

(57) ABSTRACT

An air spring and shock absorber unit for use in vehicle suspension systems or cab suspension systems comprising a shock absorber mounted within an air spring. The lower end of the air spring bellows is attached to the air spring piston in such a manner which enables the lower end of the bellows to be disconnected from the air spring piston without damaging the crimp ring which connects the bellows to the piston.

2 Claims, 4 Drawing Sheets

AIR SPRING AND SHOCK ABSORBER ASSEMBLY FOR USE IN SUSPENSION SYSTEMS

BACKGROUND OF THE INVENTION

1. Field of the Invention

This invention relates to an air spring and shock absorber assembly for use in suspension systems and more particularly to an air spring and shock absorber assembly for use in vehicle suspension systems. Even more particularly, the invention relates to an air spring and shock absorber assembly wherein the lower end of the air spring bellows may be disconnected from the air spring piston without removing, i.e., destroying, the lower crimp ring or clamping ring, thereby enabling a substitute air spring piston to be installed in the assembly so that the characteristics of the assembly may be changed.

2. Description of the Related Art

Many different types of air spring and shock absorber assemblies have been previously provided for use in suspension systems such as vehicle suspension or cab suspension systems. For example, see U.S. Pat. Nos. 5,649,692; 6,443,436; and 6,715,744. Each of the assemblies of the above-identified patents includes a shock absorber and an air spring which includes an air spring bellows and an air spring piston. If it is desired to change the characteristics of the air spring and shock absorber assemblies of the prior art, the same may be achieved by replacing the air spring piston with a substitute piston which has different characteristics.

In U.S. Pat. No. 5,649,692, one end of the air spring bellows 21 is attached to the air spring piston (turret tube) 23 by means of a clamping ring 22b. If it is necessary to disconnect the bellows 21 from the piston 23, to enable a substitute piston to be utilized in the assembly, the clamping ring 22b must be cut or severed to accomplish the disconnection. Subsequent reinstallation of a substitute piston 23 requires that a new clamping ring be used which involves labor and material cost issues.

In U.S. Pat. No. 6,643,436, one end of the air spring bellows 72 is attached to the air spring piston 76 by a clamping ring 78. The assembly of U.S. Pat. No. 6,643,436 suffers the same disadvantages as set forth with respect to U.S. Pat. No. 5,649,692 discussed hereinabove. In U.S. Pat. No. 6,715,744, one end of the air spring bellows 26 is secured to the air spring piston by an unnumbered clamping or crimp ring. The assembly of U.S. Pat. No. 6,715,744 likewise faces the same disadvantages as addressed above with respect to the assembly of U.S. Pat. No. 5,649,692.

Another consideration in air spring and shock absorber assemblies of the prior art is that there is a pre-loading on the shock absorber end mounts which causes vibration transmission therethrough. In most assemblies of the prior art, the lifting force of the air spring is being transmitted through the shock absorber end mounts which pre-loads them with a very high force and makes noise and vibration transmission much more prevalent.

SUMMARY OF THE INVENTION

An air spring and shock absorber assembly for use in a suspension system such as a vehicle suspension systems or a cab suspension system is disclosed and comprises a shock absorber and an air spring. The shock absorber includes a body having upper and lower ends and an exterior surface with the body having at least one projection extending outwardly therefrom above its lower end. A base end mount is provided on the lower end of the body and a rod end mount is provided on the upper end of the piston rod which extends upwardly from the body. Damping means is provided in the body for yieldably resisting movement of the piston rod with respect to the body.

The air spring includes an end cap which is positioned above and which is operably secured to the rod end mount of the shock absorber. The air spring includes a flexible bellows having upper and lower ends with the upper end of the bellows being sealably secured to the end cap. The air spring also includes an air spring piston which has upper and lower ends with the piston having a central bore extending therethrough between its upper and lower ends. The piston also has a reduced diameter portion at its upper end. The shock absorber body is received by the central bore in the piston with at least one projection on the shock absorber body engaging the lower end of the piston to prevent downward movement of the air spring piston with respect to the shock absorber body.

At least one O-ring seal is provided in the central bore of the piston which is in sealing engagement with the exterior surface of the body of the shock absorber. The piston also has an air passageway extending thereinto which is in communication with the central bore thereof above the O-ring seal with the air passageway being in communication with a source of pressurized air. A resilient O-ring, having inner and outer surfaces, is positioned on the reduced diameter portion of the piston. The lower end of the bellows embraces the resilient O-ring and a lower crimp ring secures the lower end of the bellows to the resilient O-ring.

The resilient O-ring permits the resilient O-ring, the lower end of the bellows and the lower crimp ring to be selectively disconnected, as a unit, from the air spring piston to permit the piston to be replaced by a substitute piston and to reinstall the resilient O-ring, lower end of the bellows and the lower crimp ring, as a unit, onto the substitute piston.

The rod end mount at the upper end of the piston rod is configured in such a way that when the assembly is static, there is no pre-load on the rod end mount.

It is therefore a principal object of the invention to provide an improved air spring and shock absorber assembly.

Still another object of the invention is to provide an air spring and shock absorber assembly including a novel means for connecting the lower end of the air spring bellows to the upper end of the air spring piston so that the piston may be removed from the assembly and substituting a different piston without destroying the lower crimp ring which connects the bellows to the piston.

Still another object of the invention is to provide an air spring and shock absorber assembly wherein the rod end mount is configured in such a way that when the component is static, there is no pre-load on the rod end mount.

It is a further object of the invention to provide an air spring and shock absorber assembly which permits the air spring piston to be easily exchanged for a piston with a different profile yielding a different spring rate.

These and other objects will be apparent to those skilled in the art.

DETAILED DESCRIPTION OF THE INVENTION

Figure 1:
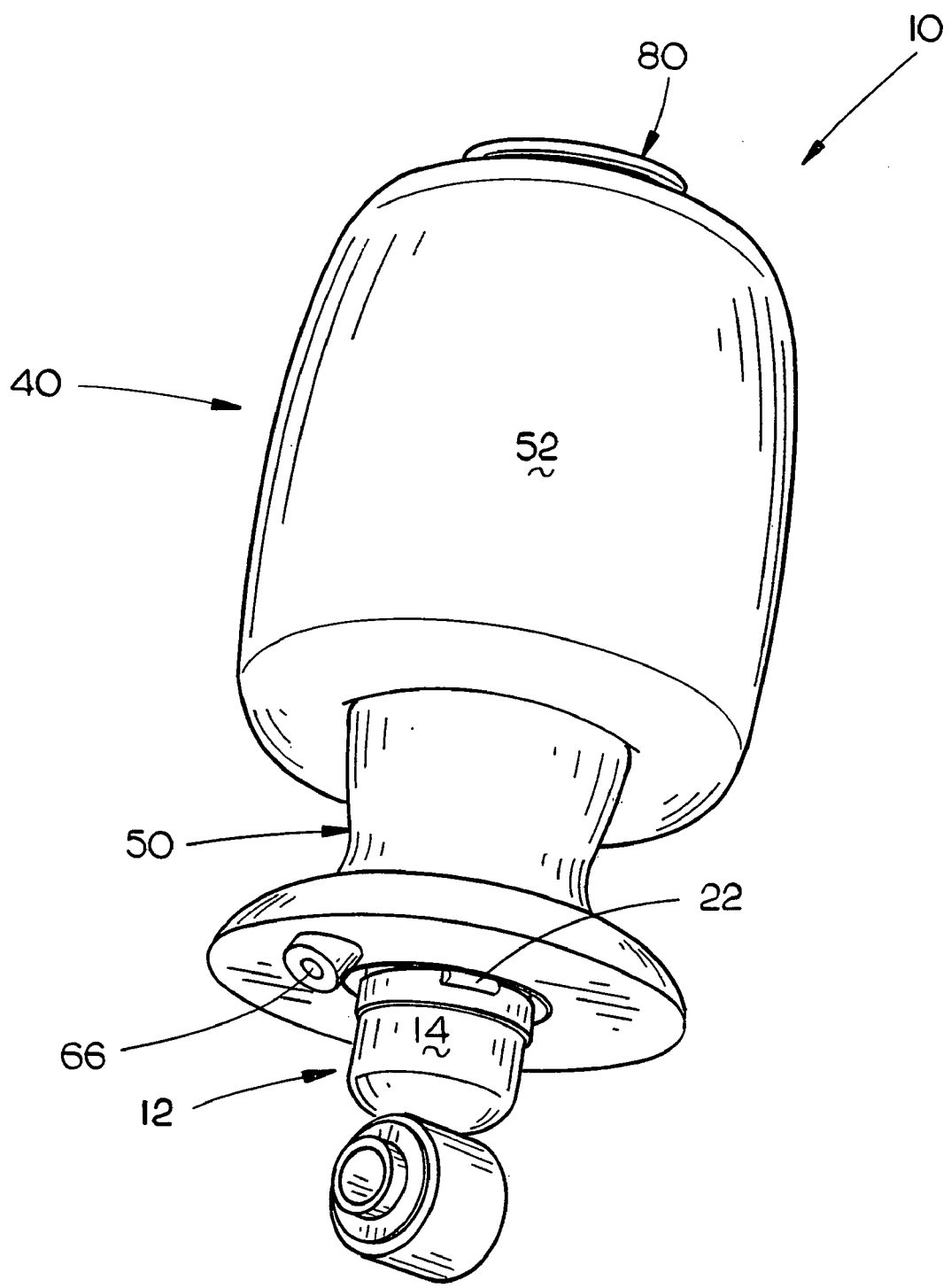
FIG. 1 is a perspective view of the air spring and shock absorber assembly of this invention.
Figure 2:
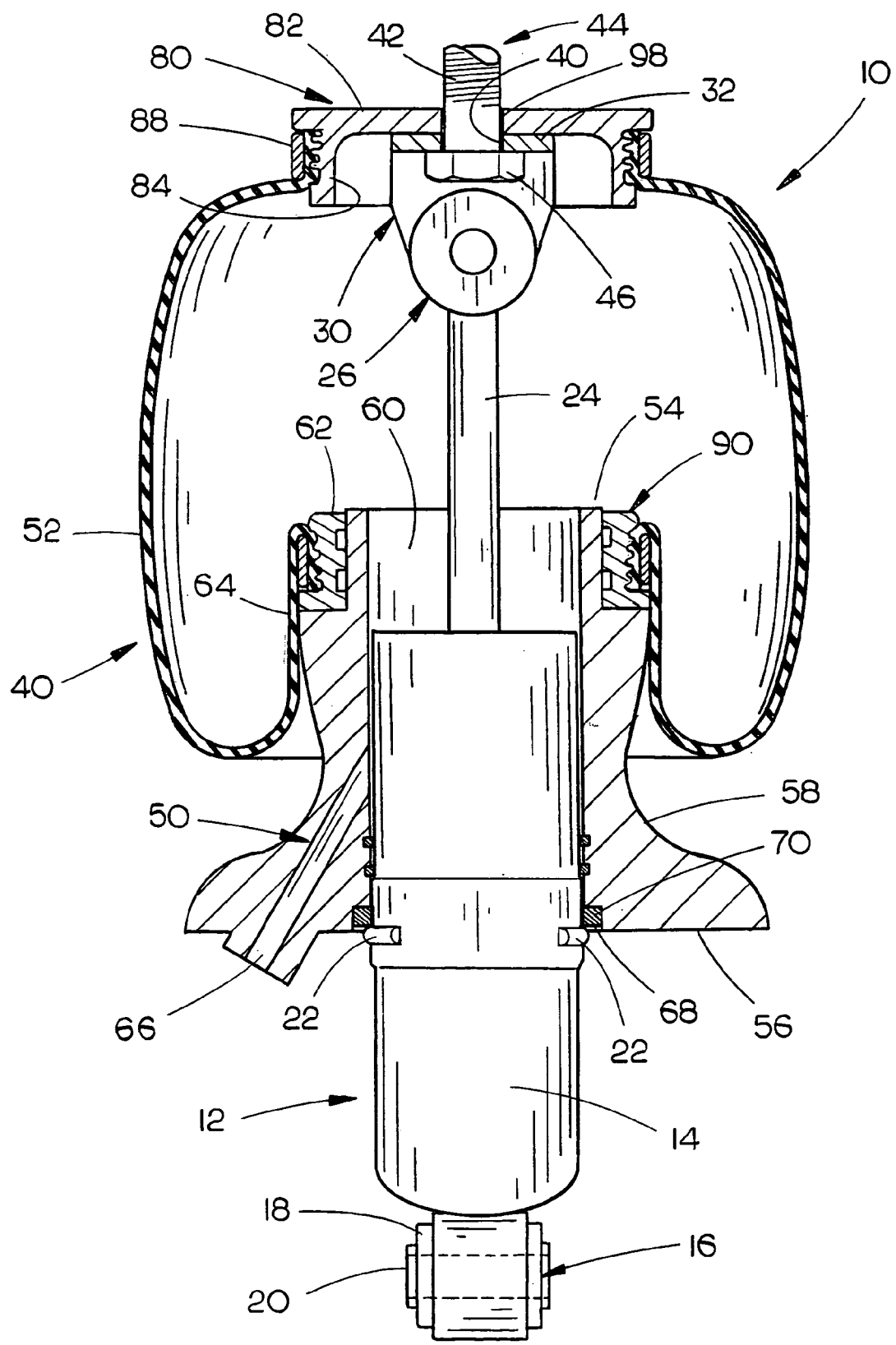
FIG. 2 is a sectional view of the assembly of this invention.
Figure 3:
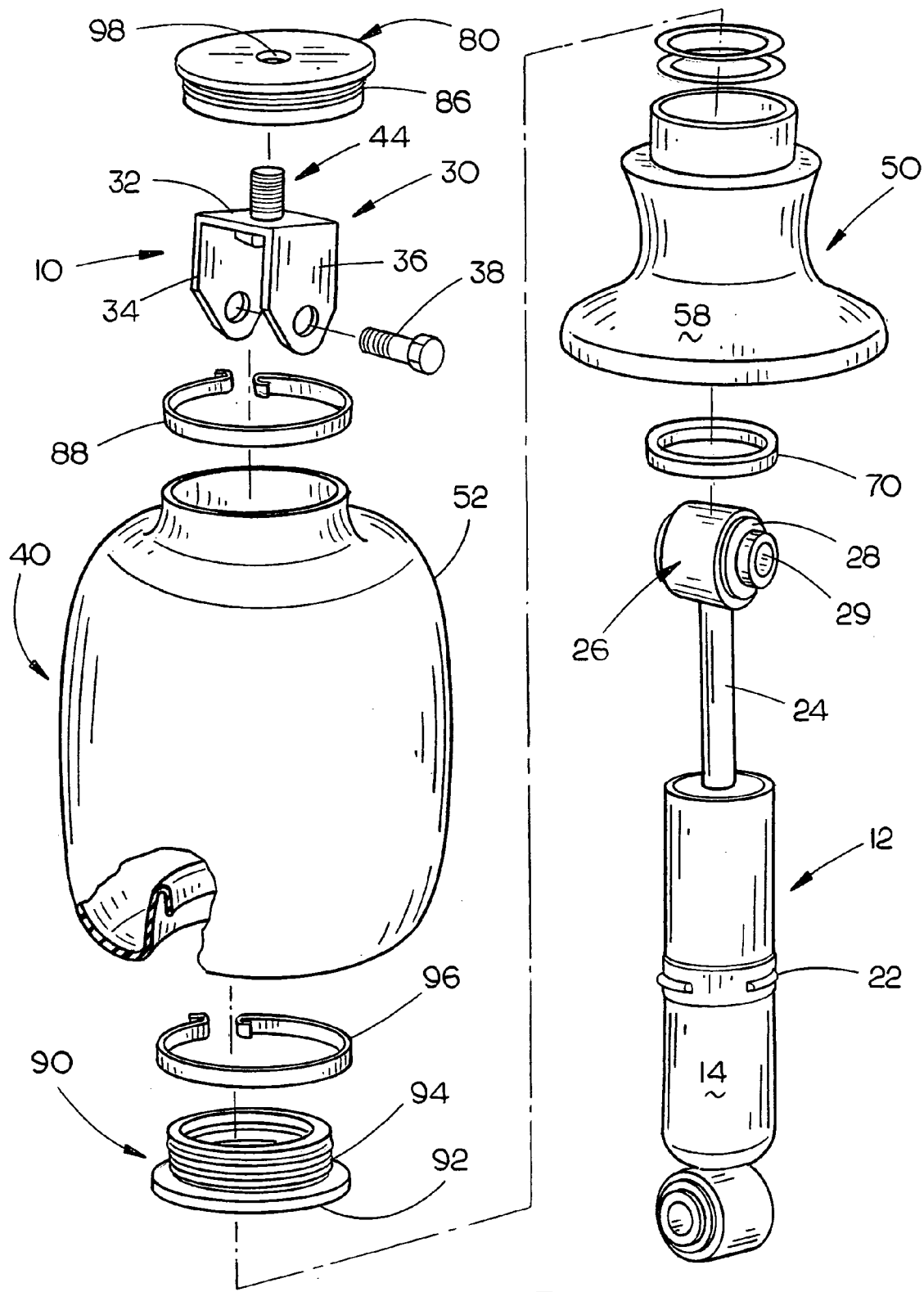
FIG. 3 is an exploded perspective view of the assembly of this invention.
Figure 4:
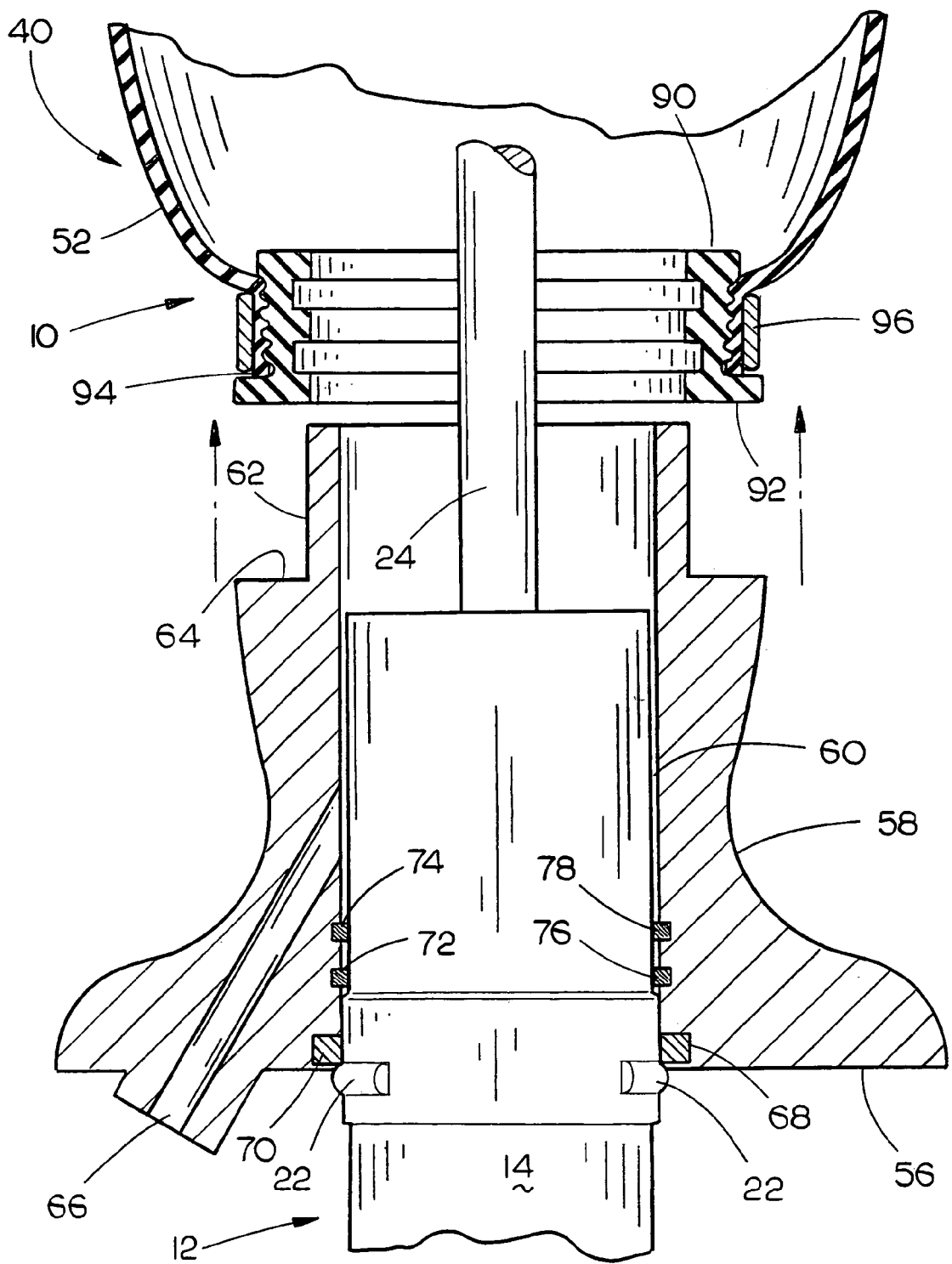
FIG. 4 is a partial sectional view illustrating the manner in which the air spring bellows, O-ring and crimp ring are removable, as a unit, from the air spring piston.

The numeral 10 refers to the air spring and shock absorber assembly of this invention which is designed for air-suspended vehicles or for vehicle cab suspensions. One end of the assembly is operably secured to the vehicle frame with the other end thereof operably secured to the vehicle axle or control arm associated therewith if the assembly is used in a vehicle suspension system. If the assembly is used in a vehicle cab suspension, one end of the assembly will be secured to the vehicle cab and the other end will be secured to the frame of the vehicle.

Assembly 10 includes a conventional shock absorber 12 having a body 14 which has a base end mount 16 provided at the lower or base end thereof. Mount 16 includes a conventional rubber or resilient bushing 18 having a metal sleeve 20 positioned thereon. The outer surface of body 14 has a plurality of radially spaced-apart protrusions or projections 22 extending outwardly therefrom above the base end thereof. Rod 24 slidably extends from the upper end of body 14 and has a rod end mount 26 provided on the upper end thereof. Mount 26 includes a conventional rubber or resilient bushing 28 mounted thereon having a metal sleeve 29 positioned therein. Shock absorber 12 includes conventional damping means contained within body 14 to yieldably urge rod 24 upwardly from body 14 and to yieldably resist the downward movement of rod 24 into body 14.

Clevis 30 is mounted on rod end mount 26 and includes a top plate 32 having ears or clevis elements 34 and 36 extending downwardly therefrom. Bolt or pin 38 extends through the ears 34, 36 and sleeve 29 to connect the clevis 30 to the rod end mount 26. Plate 32 as a central opening 40 formed therein which receives the threaded shank 42 of bolt 44 extending therethrough. As seen, the head 46 of bolt 44 is positioned below plate 32.

The numeral 48 refers to the air spring portion of assembly 10 which includes a piston 50 and a flexible bellows 52. Piston 50 includes an upper end 54, lower end 56, an outer bellows roll-out surface 58 and a central bore 60 extending between the upper and lower ends of the piston. The upper outer surface of piston 50 is provided with a reduced diameter portion 62 defined by shoulder 64 at the lower end thereof. Air passageway 66 extends upwardly and downwardly through piston 50 to central bore 60. Piston 50 has an annular recess or groove 68 formed therein at the lower end of bore 60 which is adapted to receive a metal O-ring 70 therein. Piston 50 is also provided with a pair of vertically spaced, annular grooves or recesses 72 and 74 formed therein above recess 68 which are adapted to receive resilient O-ring seals 76 and 78 therein, respectively.

As seen, shock absorber 12 is inserted upwardly through bore 60 of piston 50 until the projections 22 on body 14 engage the metal O-ring 70 which limits further upward movement of shock absorber 12 with respect to piston 50. The O-ring seals 76 and 78 sealably engage the exterior surface of body 14 of shock absorber 12 to prevent the passage of air thereby.

The numeral 80 refers to a metal or plastic end cap which includes a disc-shaped upper end 82 having an annular skirt 84 extending downwardly therefrom inwardly of the periphery of upper end 82. The outer surface of skirt 84 is preferably provided with a recessed portion 86 above the lower end thereof which has protruding ridges. The upper end of bellows 52 is positioned in recessed portion 86 and is secured to skirt 84 of end cap 80 by a conventional crimp ring 88.

A resilient O-ring 90 is mounted on reduced diameter portion 62 of piston 50 and has its lower end 92 in engagement with shoulder 64 of reduced diameter portion 62. The outer surface of O-ring 90 has an annular recessed portion 94 formed therein which preferably has annular ridges projecting therefrom. The lower end of bellows 52 is received by recessed portion 94 of O-ring 90 and is secured to O-ring 90 by a conventional crimp ring 96.

Bolt 44 extends upwardly through opening 98 in end cap 80 to secure the clevis 30 to end cap 80. Bolt 44 is also designed to secure the end cap 80 and the assembly 10 to the vehicle frame or cab. The base end mount 16 will be operably secured to the vehicle axle or a control arm operably connected thereto or to the frame of the vehicle.

When it is desired to change the piston 50 in the assembly 10 to change the characteristics of the assembly 10, the end cap 80 and the base end mount 16 will normally be disconnected from the vehicle. The lower end of bellows 52 and the resilient O-ring 90 and crimp ring 96 are then pulled off the reduced diameter portion 62 of piston 50 together, which is made possible by the resilient O-ring 90 and which is accomplished without removing or cutting the crimp ring 96. A new piston, having the desired characteristics is then substituted for the removed piston. The O-ring 90 having the lower end of the bellows 52 maintained thereon by the crimp ring 96 is then slipped onto the reduced diameter portion 62 of the new piston 50. The assembly 10 is then secured to the vehicle as previously described. Although it has been described and preferred that the O-ring 90 stays with the bellows 52 and the crimp ring 96 during the disconnection of the piston 50 from the bellows 52, it is possible that the bellows 52 and the crimp ring 96 may be removed from the piston without removing the O-ring 90 from the piston 50.

Thus it can be seen that the invention accomplishes at least all of its stated objectives.

We claim:

1. An air spring and shock absorber assembly for use in a vehicle suspension system, comprising:

a shock absorber including a body having upper and lower ends and an exterior surface, said body having at least one projection extending outwardly from its exterior surface about its said lower end, a base mount at said lower end of said body, an elongated piston rod extending upwardly from said body, damping means in said body for yieldably resisting movement of said piston rod with respect to said body, and a rod mount on the upper end of said piston rod;

an air spring including an end cap positioned above and operably secured to said rod mount, a resilient bellows having upper and lower ends, said upper end of said bellows being sealably secured to said end cap, an air spring piston having upper and lower ends, said piston having a central bore extending between its said upper and lower ends, said piston also having a reduced diameter portion at its said upper end;

said shock absorber body being received by said central bore in said piston with said at least one projection engaging said lower end of said piston to prevent downward movement of said piston with respect to said shock absorber body;

at least one O-ring seal provided in said central bore of said piston which is in sealing engagement with the exterior surface of said body of said shock absorber;

said piston having an air passageway extending thereinto which is in communication with said central bore thereof above said O-ring seal;

said air passageway being in communication with a source of pressurized air;

a resilient O-ring, having inner and outer surfaces, positioned on said reduced diameter portion of said piston;

said lower end of said bellows embracing said resilient O-ring;

and a lower crimp ring securing said lower end of said bellows to said resilient O-ring;

said resilient O-ring permitting said resilient O-ring, said lower end of said bellows and said lower crimp ring to be selectively disconnected, as a unit, from said piston to permit said piston to be replaced by a substitute piston and to reinstall said resilient O-ring, said lower end of said bellows and said lower crimp ring, as a unit, onto said substitute piston.

2. An air spring and shock absorber assembly for use in a vehicle suspension system, comprising:

a shock absorber including a body having upper and lower ends and an exterior surface, said body having at least one projection extending outwardly from its exterior surface about its said lower end, a base mount at said lower end of said body, an elongated piston rod extending upwardly from said body, damping means in said body for yieldably resisting movement of said piston rod with respect to said body, and a rod mount on the upper end of said piston rod;

an air spring including an end cap positioned above and operably secured to said rod mount, a resilient bellows having upper and lower ends, said upper end of said bellows being sealably secured to said end cap, an air spring piston having upper and lower ends, said piston having a central bore extending between its said upper and lower ends, said piston also having a reduced diameter portion at its said upper end;

said shock absorber body being received by said central bore in said piston with said at least one projection engaging said lower end of said piston to prevent downward movement of said piston with respect to said shock absorber body;

at least one O-ring seal provided in said central bore of said piston which is in sealing engagement with the exterior surface of said body of said shock absorber;

said piston having an air passageway extending thereinto which is in communication with said central bore thereof above said O-ring seal;

said air passageway being in communication with a source of pressurized air;

a resilient O-ring, having inner and outer surfaces, positioned on said reduced diameter portion of said piston;

said lower end of said bellows embracing said resilient O-ring;

and a lower crimp ring securing said lower end of said bellows to said resilient O-ring;

said resilient O-ring permitting said lower end of said bellows and said lower crimp ring to be selectively disconnected, as a unit, from said resilient O-ring and said piston to permit said piston to be replaced by a substitute piston and to connect said lower end of said bellows and said lower crimp ring, as a unit, onto said substitute piston having a resilient O-ring mounted thereon.

* * * * *